United States Patent
Gray (10) Patent No.: US 9,965,895 B1
(45) Date of Patent: May 8, 2018

(54) AUGMENTED REALITY CAMERA LUCIDA

(71) Applicant: A9.com, Inc., Palo Alto, CA (US)

(72) Inventor: Douglas Ryan Gray, Redwood City, CA (US)

(73) Assignee: A9.com, Inc., Palo Alto, CA (US)

( * ) Notice: Subject to any disclaimer, the term of this patent is extended or adjusted under 35 U.S.C. 154(b) by 274 days.

(21) Appl. No.: 14/221,104

(22) Filed: Mar. 20, 2014

(51) Int. Cl.
*G06T 19/00* (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| | | | | |
|---|---|---|---|---|
| 8,705,893 B1* | 4/2014 | Zhang | G06K 9/00201 | 345/418 |
| 8,878,846 B1* | 11/2014 | Francis, Jr. | G06T 19/006 | 345/420 |
| 2006/0018546 A1* | 1/2006 | Lagardere | G06K 9/222 | 382/186 |
| 2012/0268490 A1* | 10/2012 | Sugden | G09G 3/003 | 345/633 |
| 2013/0044131 A1* | 2/2013 | Milad | H04R 3/00 | 345/633 |
| 2013/0141428 A1* | 6/2013 | Gipson | G06T 19/003 | 345/419 |
| 2014/0210856 A1* | 7/2014 | Finn | G01C 15/002 | 345/633 |
| 2014/0327792 A1* | 11/2014 | Mulloni | G06T 7/0042 | 348/211.8 |
| 2015/0242697 A1* | 8/2015 | Guo | G06T 7/0014 | 382/128 |
| 2015/0348329 A1* | 12/2015 | Carre | G06Q 30/02 | 345/633 |

\* cited by examiner

*Primary Examiner* — Maurice L McDowell, Jr.
*Assistant Examiner* — Donna J Ricks
(74) *Attorney, Agent, or Firm* — Hogan Lovells US LLP (57) ABSTRACT

Approaches are described for enabling a user to create an accurate perspective rendering of a source (e.g., a scene, object, subject, point of interest, etc.) on a drawing surface. For example, various approaches enable superimposition of the source being viewed upon a drawing surface upon which a user is drawing. In this way, the user can view both the source and drawing surface simultaneously. This allows the user to duplicate key points of the source on the drawing surface by viewing a display of a device, thus aiding in the accurate rendering of perspective.

16 Claims, 7 Drawing Sheets

AUGMENTED REALITY CAMERA LUCIDA

BACKGROUND

As computing devices offer increasing processing capacity and functionality, users are able to operate these devices in an expanding variety of ways. For example, cameras on portable devices are capable of capturing images and delivering these images for use by the user. In some instances, the user may want to use the captured images to create an accurate perspective rendering of a source (e.g., a scene or object) represented in one or more of the images. A user can print an image from their device and attempt to create a representation of the image. However, the user may lack the knowledge or resources required to print the image, or otherwise may not want to go through the steps in doing so. The user can attempt to create the image by viewing a representation of the source displayed on the device, but may find this process cumbersome and inefficient. Some users attempt to create a representation of the image using certain mechanical devices, such as a Camera Lucida. However, when using such a device the user has to be in the physical location of the source when creating the representation of the source. Further, the user has to purchase and learn how to use the device, which can result in a significant and unnecessary use of time as well as a substantial cost in purchasing such a device. Further still, such devices are sensitive to movement, which can result in an unacceptable reproduction of the source. As technology evolves and as the features offered on computing devices expand, the way in which users interact and control these devices is changing.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the foregoing or other deficiencies experienced conventional approaches to acquiring and/or displaying images using an electronic device. In particular, various embodiments enable a computing device (e.g., a mobile phone) or other portable computing device to enable a user to create an accurate perspective rendering of a source (e.g., a scene, an object, a subject, a point of interest, etc.) on a physical drawing surface. In particular, various approaches enable superimposing a representation of the source being viewed over a representation of a drawing surface upon which a user is drawing. In this way, the user can view both the source and physical drawing surface simultaneously. This allows the user to duplicate key points of the source on the drawing surface when viewing a display of a device, thus aiding in the accurate rendering of perspective.

For example, in accordance with various embodiments, a portable computing device can acquire a source image of a source (e.g., a scene, an object, a subject, a point of interest, etc.) using a camera of the device or can utilize images that have already been acquired and/or stored. Further, the device can acquire an image of a physical drawing surface and the image of the physical drawing surface can be analyzed to determine a boundary that confines, is proximate to or is otherwise within a predetermined distance of a representation of the drawing surface. This can include, for example, utilizing at least one feature detection algorithm to identify a location of one or more registration marks on a representation of the drawing surface and then determining a boundary based on a location of those registration marks. Once the boundary is determined, a representation of the source can be overlaid over the representation of the drawing surface. In certain embodiments, a guide can be provided to help a user position the representation of the source on the representation of the drawing surface where the user intends to create (e.g., draw, sketch, paint, etc.) the source. The representation of the source can be locked such that a placement of the representation of the source over the representation of the drawing surface remains in substantially a same location over the representation of the drawing surface during any movement of the device. For example, in response to a movement of the device, a location of the drawing surface relative to the computing device can be tracked and a display of the representation of the source can appear "fixed" to the representation of the drawing surface. Advantageously, approaches enable a user to create an accurate representation of the source by viewing the display of the device while creating the source on the physical drawing surface.

Various other functions and advantages are described and suggested below as may be provided in accordance with the various embodiments.

Figure 1:
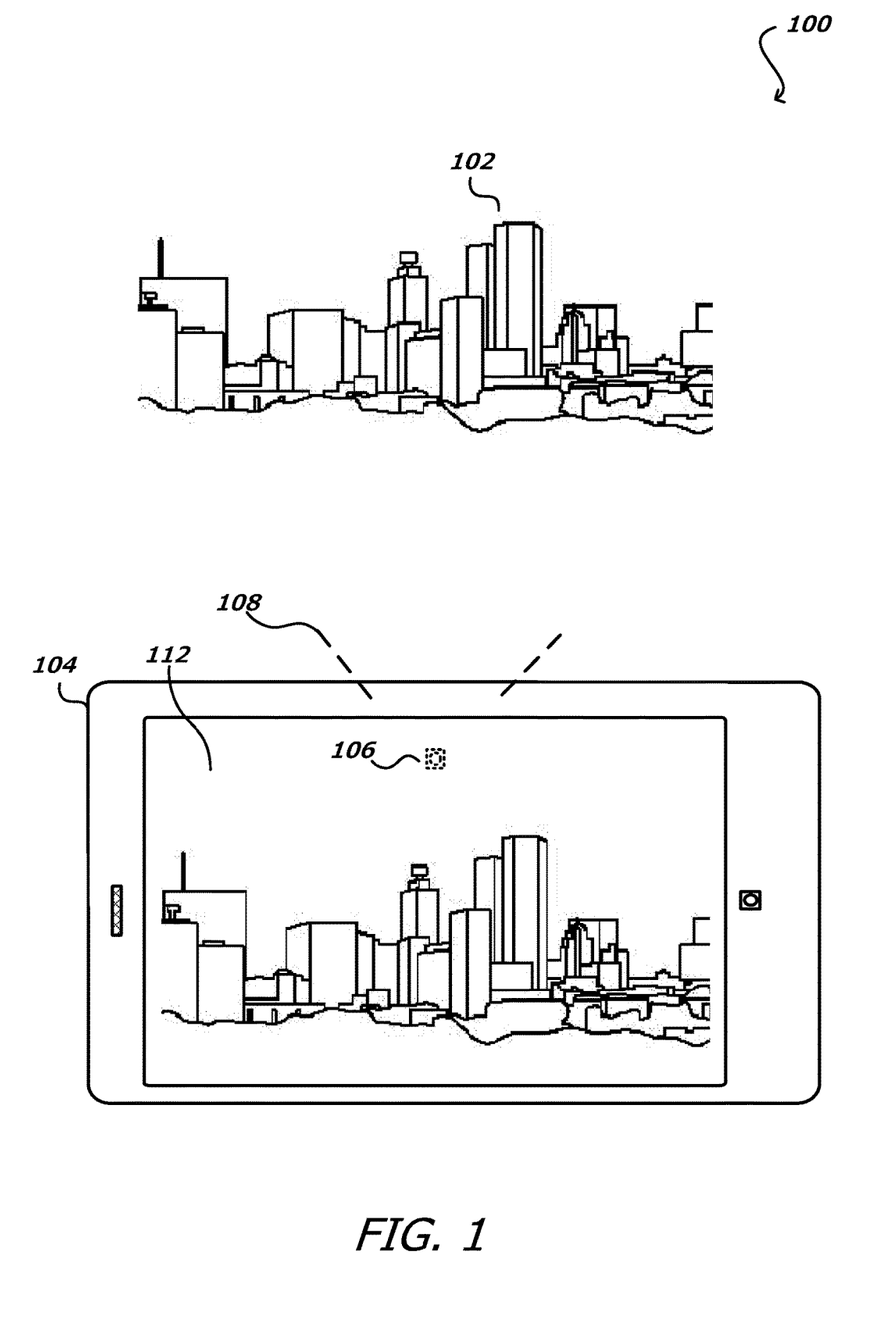
FIG. 1 illustrates an example situation where a user can view content and interact with a computing device in accordance with various embodiments.

FIG. 1 illustrates an example situation 100 wherein a computing device 104 is being used to capture a scene of a city landscape. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the device is displaying a view of a scene 102 in the field of view of at least one camera of the computing device. In this example, the scene 102 is a city landscape. Using an appropriate application executing on a computing device, a user (not shown) is able to obtain an image of the scene 102 by positioning the computing device such that the scene is within a field of view 108 of at least one camera 106 of the computing device. It should be understood, however, that there can be additional and/or alternative cameras placed in similar or alternative locations in accordance with various embodiments, and that information from any or all of these cameras can be analyzed as appropriate. Each image capture element may be, for example, a charge-coupled device (CCD), a motion detection sensor, or an infrared sensor, or can utilize another appropriate image capturing technology. The device can include other sensors for capturing information as well, such as at least one microphone operable to capture audio data, a motion sensor for detecting motion, an orientation sensor for determining device orientation, and/or a position sensor for acquiring position data, such as geo-data, among others.

In this example, the camera 106 on the device 104 acquires a source image that includes a representation of a scene 102 of interest (e.g., a city landscape), and at least a portion of the source image is displayed on a display screen 112 of the computing device. As described, the user may want to use the acquired image to create an accurate perspective rendering of the city landscape. In conventional embodiments, the user can print the source image from their device and attempt to draw the representation of the city landscape from the printout. For example, the user can lay a physical drawing surface over the printout and attempt to draw the city landscape as viewed through the drawing surface, however the user may not be able to lay the physical drawing surface over the printout due to a size, shape, transparency, or other characteristic of the physical drawing surface. The user can attempt to create the representation of the city landscape by viewing the source image displayed on the device, but may find this process cumbersome and inefficient. Additionally, there can be issues on how to control imaging editing features that modify the image in order to assist the user in creating an accurate perspective rendering of the city landscape, such features allowing for adjusting a contrast of the source image, displaying an outline of the city landscape image, among other image editing techniques useful in adjusting an appearance of the image. In other approaches, the user can attempt to create the city landscape using certain mechanical devices, such as a Camera Lucida. However, when using such a device the user has to be in the physical location of the city landscape. Further, the user has to purchase and learn how to use the device, which can result in a significant and unnecessary use of time and resources. Further still, such devices are sensitive to movement, often times resulting in a misaligned representation of the source.

Accordingly, in accordance with various embodiments, a computing device such as a mobile phone or other portable computing device can enable a user to create an accurate perspective rendering of a source of, for example, a scene or object on a physical drawing surface. For example, various embodiments enable superimposition of a representation of the source on a representation of a drawing surface. In this way, the user can view both the source and drawing surface simultaneously. This allows the user to duplicate key points of the source on the drawing surface by viewing a display of a device, thus aiding in the accurate rendering of perspective.

Figure 2A:
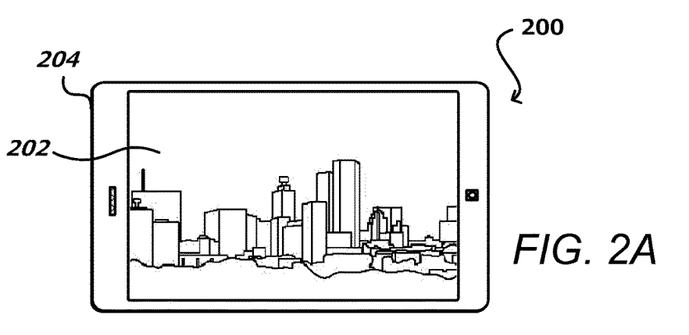
FIGS. 2A-2C illustrate example augmented reality application view displayed on a computing device in accordance with an embodiment.

For example, FIG. 2A illustrates an example situation 200 wherein a user has captured or downloaded a source image of a city landscape and intends to create a drawing of the city landscape on a drawing surface such as a canvas. Alternatively, in accordance with various embodiments, the user can access an image gallery or other collection of images, where the images can correspond to at least a subset of images stored in a particular location, relating to a particular topic, or otherwise associated by one or more topics or categories, for example. As shown, a representation of a scene (e.g., city landscape 202) is displayed on a display element of computing device 204. Although an image of a city landscape is used, embodiments described herein can apply to any object, subject, or point of interest such as people, animals, landscapes, statutes, buildings, etc. Various other types of images might be of interest to the user as well. For example, the user can use the computing device to download a three-dimensional model of an object, e.g., a favorite figurine. The user can maneuver the model until the user has decided on an ideal view or appearance of the three-dimensional model. Maneuvering the model can include changing a zoom level of the model, rotating the model, etc. Thereafter, the user can at least capture and save the view as the source image for drawing. Capturing and saving the view can include, for example, using a download or save feature of the device, taking a screen shot of the view and saving the screen shot, etc. In certain embodiments, the user can use the device to generate a three-dimensional model of a physical object. For example, the user can capture video or multiple images of an object from different angles and perspectives, and based at least in part on the video and/or images, one or more image processing algorithms can be used to generate a three-dimensional model of the physical object. Various other approaches known in the art can be used to generate a three-dimensional representation of a physical object using cameras and various other sensors of a computing device.

Figure 2B:
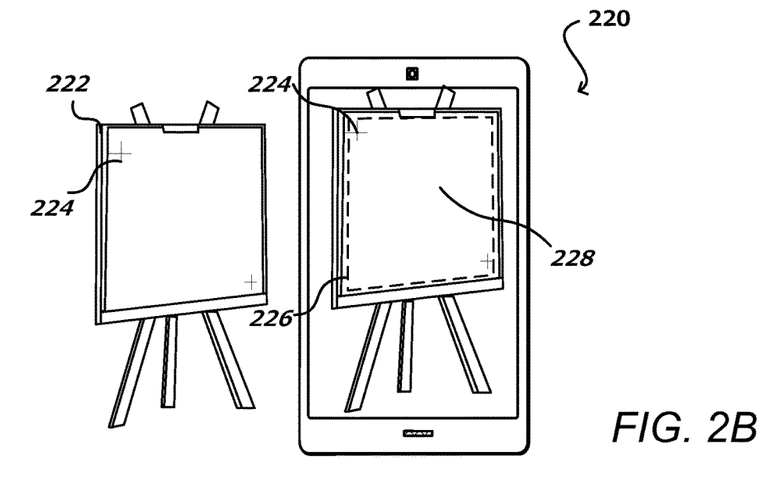

Once the user acquires the image of the city landscape (i.e., the source image), the user acquires an image on a physical drawing surface 222 in order to enable superimposition of the representation of the city landscape over a representation of the drawing surface 228 upon which a user is drawing, as shown in example situation 220 of FIG. 2B. In this example, the drawing surface can be, for example, canvas, paper, or other surface such as a wall, street, etc., or any other material or object that can receive some type of marking. In certain embodiments, the drawing surface can include one or more registration marks 224 or other marks that can be used to determine a boundary 226 that confines a representation of the drawing surface, where the boundary can be represented by a shape, a bounding box, a set of feature points, and the like. The registration marks can be generated by the user or marks already on the drawing surface. The marks can be generated using any number of different instruments as may include a writing instrument, a drawing instrument, a painting instrument, or any instrument capable of leaving a mark. The marks generated by the user can include, for example, shapes, boundary marks, random markings, structured markings, among others.

A number of approaches can be used to determine the registration marks. In one such approach, the image of the drawing surface 228 can be analyzed to detect the registration marks 224. This can include using one or more feature detection algorithms to detect feature points or other points indicative of the registration markings. For example, the feature points can be detected by using one of a number of detection algorithms, such as scale-invariant feature transform (SIFT), speeded up robust features (SURF), among others. The registration markings can be used to determine a boundary that confines, is proximate to, otherwise within a predetermined distance a representation of the drawing surface. In certain embodiments, the boundary can be determined using the shape of the drawing surface. For example, a drawing canvas is often square or rectangle and the corners or edges of the drawing surface can be detected using one of a corner or edge detection algorithm, such as a Harris corners detection algorithm or other edge detection algorithm. In various embodiments, the user can indicate a boundary that confines the drawing surface such as by "tapping" and tracing a boundary around the representation of the drawing surface, tagging the drawing surface, or providing an input that otherwise indicates the drawing surface.

Figure 2C:
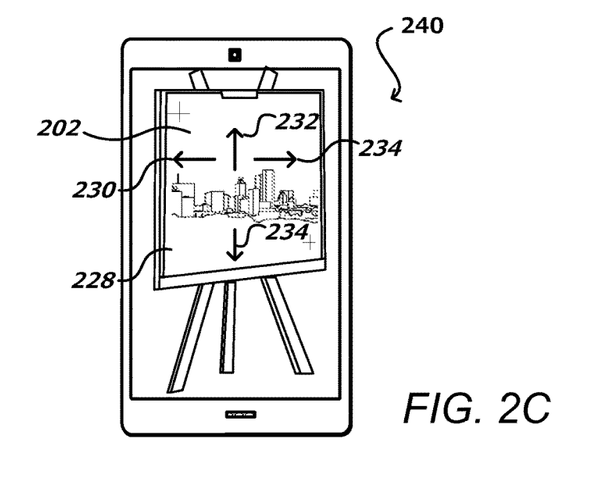

Once the boundary 226 is determined, the representation of the scene 202 can be overlaid over the representation of the drawing surface 228, as shown in 240 of FIG. 2C. In this example, the device can attempt to overlay the representation of the scene 202 over the representation of the drawing surface 228 and within the confines of the boundary 226, proximate to, otherwise within a predetermined distance a representation of the drawing surface. In accordance with another example, the user can position the representation of the scene 202 over the representation of the drawing surface 228. For example, the user can move the representation of the scene around the screen by tapping and dragging the representation of the scene to a desired location on the display screen. In accordance with various embodiments, tapping can include momentarily contacting a user's finger or object on the display screen. Dragging the representation of the scene can include contacting, holding the user's finger or an object substantially above the representation of the scene, and dragging the finger or object (while maintaining contact with the display screen) across the screen. In this way, a user-selection (tapping and/or tapping and holding) of a user-selectable element (e.g., the representation of the scene) and movement of the selecting feature (e.g., the user's feature) can cause the representation of the scene to be moved across the screen.

In various embodiments, the user can adjust a position of the representation of the scene as displayed on the display screen using one or more visual indicators. For example, in various embodiments, visual indicators can be provided to help the user position the representation of the scene where the user intends to sketch or otherwise create the scene on the representation of the drawing surface. The visual indicators can include a partially transparent view, outline, bounding region, or other such graphical element such as an arrow or other element indicating a direction of movement. The user can interact with the visual indicators such as by selecting or otherwise contacting the area of the display substantial orthogonal the visual indicator. For example, a user-selection (e.g., a tap) of visual indicator 230 can cause the representation of the scene to move to the left, a user-selection of visual indicator 232 can cause the representation of the scene to move towards the top of the computing device, a user-selection of visual indicator 234 can cause the representation of the scene to move to the right, and a user-selection of visual indicator 234 can cause the representation of the scene to move towards the bottom of the computing device. The user can ignore and/or turn off the visual indicators, if the user is not attempting to adjust the position of the representation of the scene on the display element for any particular reason. Various other approaches to assisting a user in adjusting the position of the representation of the scene on the display element can be utilized as well within the scope of the various embodiments.

Various embodiments can enable a user to apply various image editing techniques to obtain various alternate views of the representation of the scene. The types of views available, number of views available, and other such modifications can depend at least in part upon an image editing process. For example, in addition to adjusting a position of the representation of the scene, the representation of the scene can be rotated, cropped, scaled such as by adjusting a zoom level, or otherwise modified by changing a transparency view, outline view, or other view of the representation of the scene by applying the appropriate image editing process. Adjusting a zoom level can include zooming-in or zooming-out of the representation of the scene. This allows a portion of the representation of the scene displayed on the interface of the device to be adjusted such as by magnifying the view of the representation of the scene (i.e., creating a narrower field of view or "zooming in") displayed on the interface and decreasing the magnification of the view of the representation of the scene (i.e., creating a wider field of view or "zooming out") and causing the representation of the scene displayed on the device to appear smaller. Adjusting a transparency can include, for example, adjusting how "see through" a transparency level of the representation of the scene. A slider, dial, spin wheel, or other graphical indicator can be provided to adjust the transparency level from completely transparent to no level of transparency. An outline view, for example, can cause an outline or the edges of the representation of the scene to be displayed.

In accordance with various embodiments, a position of the representation of the scene as overlaid over the representation of the drawing surface can be locked such that the placement of the representation of the scene remains in substantially a same location over the representation of the drawing surface during any movement of the device. For example, as the device moves, the physical drawing surface can be tracked relative to the device so that the live view of the drawing surface as well as the placement of the representation of the scene over the representation of the drawing surface appears "fixed" or otherwise "attached" to the representation of the drawing surface.

Tracking of the drawing surface can include, for example, using one or more transformation equations to determine a mapping between a first location of the computing device and a second location of the computing device, where the first location corresponds to a location of the device when the image of the drawing surface was acquired and the second location of the computing device can corresponds to at least one other location. It should be noted that the first location and the second location can be the same or different locations. A number of different features can be used to track the drawing surface. One approach includes tracking the drawing surface based at least in part on the edges and corners of the drawing surface. As described, such features can be determined using at least one edge or corner detection algorithm. The position of drawing surface relative to the computing device can be tracked using a model fitting algorithm such a random sample consensus (RANSAC) or other such approach as may include discrete wavelet transforms, gabor wavelet transforms, among others.

In another such approach, registration markings or markings created as the user marks (e.g., draws, sketches, paints, etc.) on the physical drawing surface can be used to track the drawing surface relative to the computing device. For example, upon detecting the registration or other markings, a transformation model or other such transformation can be computed using one of, or a combination of, normalized 8-point method, (RANSAC), least median squares, among others. For example, offset values for the feature points (e.g., registration markings) can be determined, and in at least some embodiments, the transformation model can be generated. The transformation model or mappings can include transforms or adjustments to be made to the representation of the scene as a live view of the drawing canvas is displayed to display the representation of the scene positioned in the same place over the representation of the drawing surface as the device is moved. In this way, based at least in part upon the model or mappings, the appropriate image adjustments can be made to align the position of the representation of the scene on the representation of the drawing surface during the live view. For example, each registration marking or feature point on a grid can be located in an image captured by the camera and an offset or function determined for matching these locations in the image and in some embodiments, an overall adjustment such as an amount of translation and/or rotation can be determined that should be applied to an image captured by the camera. It should be noted that there are many approaches known and/or used for computing a transformation model or other such computation, such that details of such a computation will not be discussed herein in detail. It should be further noted that any approach that can determine the relationship between a first location of the computing device and a second location of the computing device relative to the drawing canvas can be used in the embodiments described herein. Further, as described, the registration markings can be determined using one of a number of detection algorithms, such as scale-invariant feature transform (SIFT), speeded up robust features (SURF), among others.

The computation of the transformation can then be used to represent the relationship between registration markings in the representation of the scene 202 and a subsequently retrieved image or images received from a camera acquiring a live view of the physical drawing surface as the computing is moved from a first location to a second location. In this way, transformations can be applied to track the drawing canvas and a display of the representation of the source "fixed" to the representation of the drawing surface can be displayed.

In various embodiments the registration markings may be erased, drawn over, or otherwise removed or blocked by other content. Accordingly, as the scene is created on the drawing canvas, a model of what is being drawn can be generated, and the model can be used to represent the relationship the physical drawing surface and a subsequently retrieved image or images received from a live view of the drawing surface as the computing is moved from one location to another location. In this example, the model can correspond to a two-dimensional representation of content presented on the physical drawing surface. Markings or other content created on the physical drawing surface can be detected and tracked over a predetermined period of time using one of a number of detection algorithms, such as scale-invariant feature transform (SIFT), speeded up robust features (SURF), among other image matching and tracking algorithms known in the art. In various embodiments, the relationship between registration markings or other content on the physical drawing surface and a subsequently retrieved image or images received from a live view of the drawing surface can be determined by at least one homography as well as other image registration algorithms, and the relationship as determined by the homography can be used to track the physical drawing canvas relative to the computing device. As is known in the art, image registration can include the process of transforming different sets of data into one coordinate system in order to, e.g., be able to compare or integrate the data obtained from these different measurements. A number of algorithms can be used such as intensity-based image registration algorithms, feature-based image registration algorithms, one or more transformation models such as a linear transformation model, spatial transformations such as RANSAC among others.

Once the position of the representation of the scene is locked in place over the representation of the drawing surface, the user can modify an appearance of the representation of the scene. A number of image processing or editing algorithms can be used to adjust the appearance of the representation of the scene, as may include algorithms to adjust brightness, contrast, and/or opacity of the representation of the scene, as well as algorithms for edge detection, corner detection. It should be noted that other image processing algorithm that can be used to manipulate, enhance, or otherwise adjust the appearance of the representation of the scene. For example, once the representation of the scene has been positioned, the user can then select various transparency and image processing settings such as edge detection to display an outline of the scene to assist them in creating content on the physical drawing surface.

Figure 3:
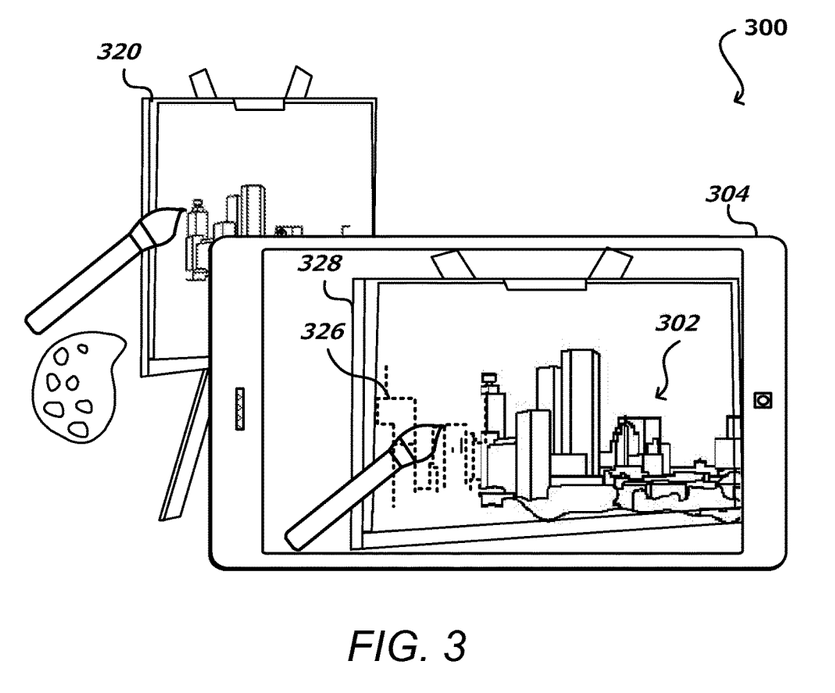
FIG. 3 illustrates an example augmented reality application view displayed on a computing device in accordance with an alternate embodiment.

As described, various approaches enable superimposition of a source (e.g., a scene, an object, a subject, etc.) being viewed over representation of a drawing surface upon which a user is drawing. In this way, the user can view both the source and the physical drawing surface simultaneously. This allows the user to duplicate key points of the source on the physical drawing surface by viewing a display of a device, thus aiding in the accurate rendering of perspective. For example, as shown in example 300 of FIG. 3, a user is drawing a scene of a city landscape (i.e., the source) on a physical drawing surface 320 while viewing an image of the city landscape 302 and a representation of the drawing surface 328 on a display element of a computing device 304. In this example, the display element includes a representation of the city landscape 302 and the drawing surface 328. As described, the user can manage the display of the representation of the city landscape, which can include changing a transparency of the representation of the city landscape, a position, as well as various other image editing effects such as creating an outline of the city landscape, adjusting the contrast of the image, etc.

As the user draws or otherwise creates add content to the physical drawing surface, the device can track the user's progress and display, for example, unfinished areas 326 of the city landscape as well as other information. For example, as shown in example 400 of FIG. 4, the display screen can display information such as the user's progress in creating the city landscape as well as various other feedback. Determining the information as well as other feedback can include, for example, tracking the user's progress and comparing the user's process to a representation of the source. Tracking the progress of the user can include generating a model corresponding to what the user has created on the physical drawing surface. Comparing the model to the source image can include, for example, comparing an outline of the source image or some other feature of the source image to a corresponding feature in the model. For example, an outline of what the user has drawn can be compared a corresponding outline of the source image, and based at least on the comparison, a determination can be made as to a level of progress the user has made in completing the image.

Figure 4:
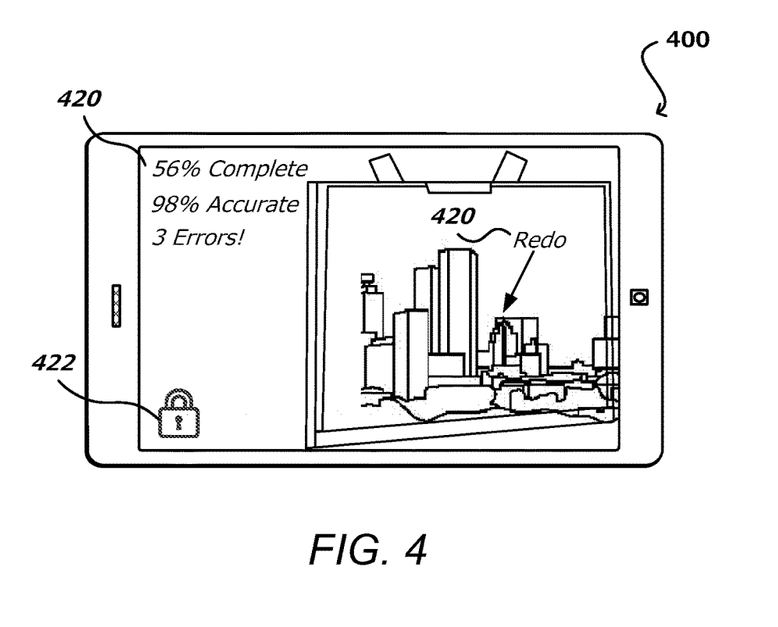
FIG. 4 illustrates an example augmented reality application view displayed on a computing device in accordance with an alternate embodiment.

In accordance with various embodiments, the level of progress can be shown in a number of different ways, including a progress bar, text, or some other textual or graphical display. For example, the color of the outline of the overlaid representation of the scene can indicate areas drawn and areas yet drawn. In this example, red lines can correspond to areas of the image that have not been sketched and green lines correspond to areas that have been sketched. In another example, comparing the model to the source image can include, analyzing a similarity between corresponding metrics between the model and the source image. The metrics can include, for example, perspective, ratio, alignment, etc. as relating to the model and the source image. In yet another example, a number of errors or other inconsistencies can be displayed to the user and an indication 420 emphasizing or otherwise pointing out the errors can be displayed on the computing device. For example, in at least one embodiment, the model can be compared to the source image, and at least one prompt can be generated based on the comparison, the at least one prompt including information indicating at least one or a progress in creating the scene or the object, a number of errors in creating the scene or the object, an indication of an error in creating the scene or the object.

In some situations, the presence of the user's hand and/or drawing instrument may affect accurately determining the model because, for example, the user's hand and/or drawing instrument may be positioned in the field of view of the camera and may block acquiring at least a portion of the source image. In this example, the user's hand and/or drawing instrument may need to be removed or otherwise masked, or the process of determining the model stopped during a time such features are detected, in order to accurately create the model. Removing or otherwise masking the user's hand, drawing instrument, or other object can include, for example, using one or a motion detector to detect a moving object, a skin or hand detector to detect the user's hand or fingers, or other object detect to detect an object in the field of view of the camera, and removing or otherwise masking the detected feature. Masking can include, for example, determining a difference between the model and content displayed on the canvas. Additionally or alternatively, during the time such features are detected, determination of the model can be stopped for at least the period of time the features are detected.

In certain embodiments, the user may desire to change a location of the representation of the scene as overlaid on the representation of the drawing surface. In such a situation, the user can select an unlock button or other graphical element 422 and can cause the image to move in the image plane of the drawing as described herein. Changing the location of the representation of the scene as overlaid on the representation of the drawing surface enables the user to create a composite sketch or create some other image effect. In other situations, the user can invoke version control and playback their process in drawing the source image. In this way, the user makes a mistake, the device can provide a virtual revision control to assist the user in what needs to be erased or modified.

Figure 5:
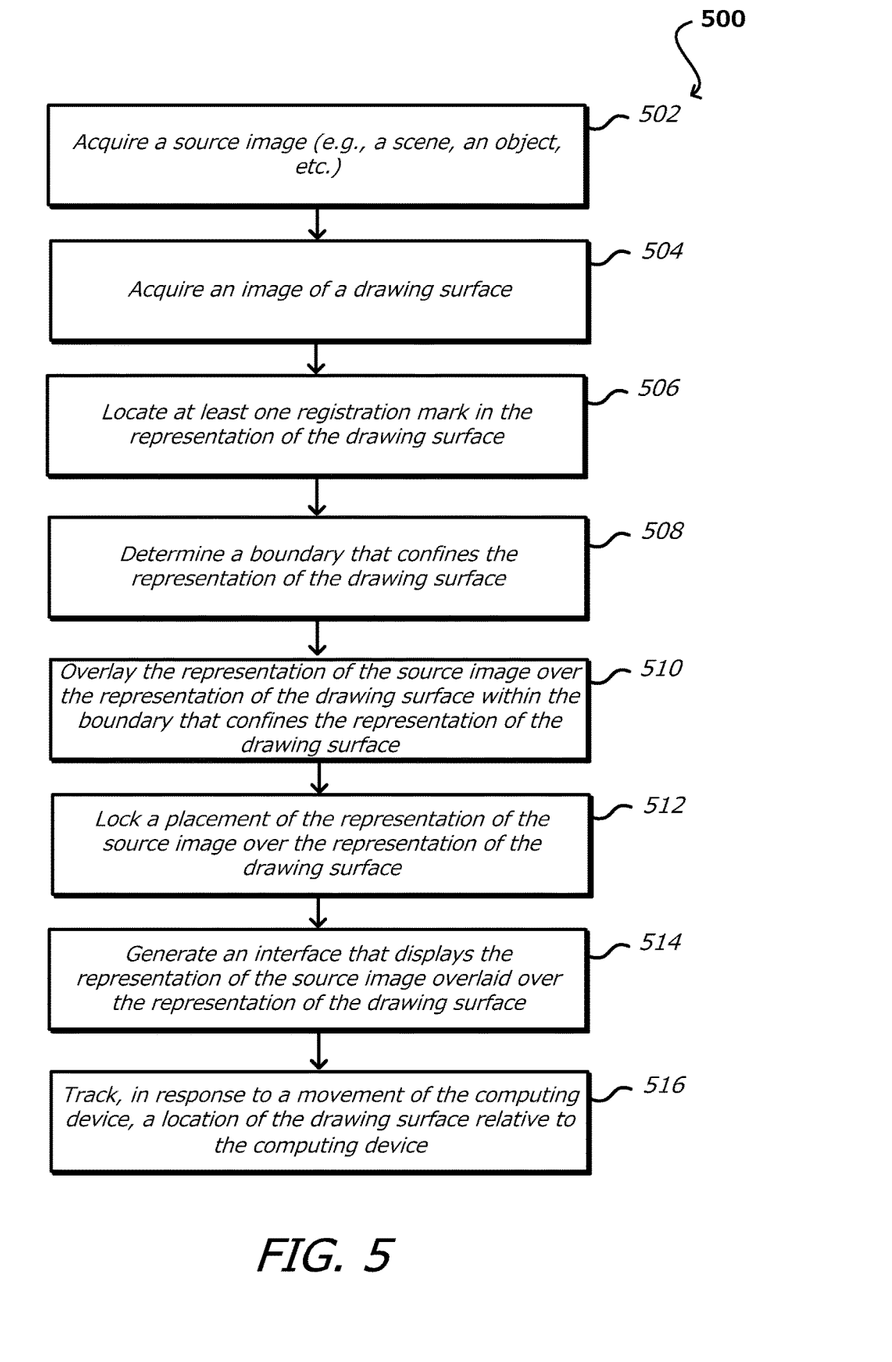
FIG. 5 illustrates an example process for managing an augmented reality view in accordance with various embodiments.

FIG. 5 illustrates an example process 500 for managing an image view display, in accordance with various embodiments. It should be understood that, for any process described herein, that there can be additional or fewer steps performed in similar or alternative orders, or in parallel, within the scope of the various embodiments unless otherwise stated. A source image of one of a scene or object is acquired 502 from one of a camera of the computing device or an application on the computing device and an image of a physical drawing surface is acquired 504 from the camera of the computing device. Alternatively, in accordance with various embodiments, the user can access an image gallery or other collection of images, where the images can correspond to at least a subset of images stored in a particular location, relating to a particular topic, or otherwise associated by one or more topics or categories, for example. At least one registration mark is located 506 in the representation of the physical drawing surface. As described, the registration marks can be generated by the user or marks already on the drawing surface. The marks can be generated using, for example, any number of different instruments as may include a writing instrument, a drawing instrument, a painting instrument, or any instrument capable of leaving a mark. The marks generated by the user can include, for example, shapes, boundary marks, random markings, structured markings, among others. A number of approaches can be used to determine the registration marks. In one such approach, the image of the drawing surface 228 can be analyzed to detect the registration marks 224. This can include using one or more feature detection algorithms to detect feature points or other points indicative of the registration markings. For example, the feature points can be detected by using one of a number of detection algorithms, such as scale-invariant feature transform (SIFT), speeded up robust features (SURF), among others. A boundary that confines the representation of the physical drawing surface is determined 508 based at least in part on a position of the registration mark. In certain embodiments, the boundary can be determined using the shape of the drawing surface. For example, a drawing canvas is often square or rectangle and the corners or edges of the drawing surface can be detected using one of a corner or edge detection algorithm, such as a Harris corners detection algorithm or other edge detection algorithm. In various embodiments, the user can indicate a boundary that confines the drawing surface such as by "tapping" and tracing a boundary around the representation of the drawing surface, tagging the drawing surface, or providing an input that otherwise indicates the drawing surface. The representation of the scene or the object is overlaid 510 on the representation of the physical drawing surface proximate the boundary. A placement of the representation of the scene or object over the representation of the drawing surface is locked 512 so that the physical drawing surface remains substantially the same despite a movement of the computing device relative to the physical drawing surface. For example, as the device moves, the physical drawing surface can be tracked relative to the device so that the live view of the drawing surface as well as the placement of the representation of the scene over the representation of the drawing surface appears "fixed" or otherwise "attached" to the representation of the drawing surface. An interface on the display element is generated 514 that displays the representation of the one of the scene or the object overlaid over the representation of the drawing surface. In response to a movement of the computing device relative to the physical drawing surface, a location of the physical drawing surface relative to the computing device is tracked 516, wherein the placement of the representation of the scene or the object remains in substantially a same location over the representation of the drawing surface during the movement of the computing device. Tracking of the drawing surface can include, for example, using one or more transformation equations to determine a mapping between a first location of the computing device and a second location of the computing device, where the first location corresponds to a location of the device when the image of the drawing surface was acquired and the second location of the computing device can corresponds to at least one other location. A number of different features can be used to track the drawing surface. One approach includes tracking the drawing surface based at least in part on the edges and corners of the drawing surface. As described, such features can be determined using at least one edge or corner detection algorithm. The position of drawing surface relative to the computing device can be tracked using a model fitting algorithm such a random sample consensus (RANSAC) or other such approach as may include discrete wavelet transforms, gabor wavelet transforms, among others. In another such approach, registration markings or markings created as the user marks (e.g., draws, sketches, paints, etc.) on the physical drawing surface can be used to track the drawing surface relative to the computing device. For example, upon detecting the registration or other markings, a transformation model or other such transformation can be computed using one of, or a combination of, normalized 8-point method, (RANSAC), least median squares, among others.

Figure 6:
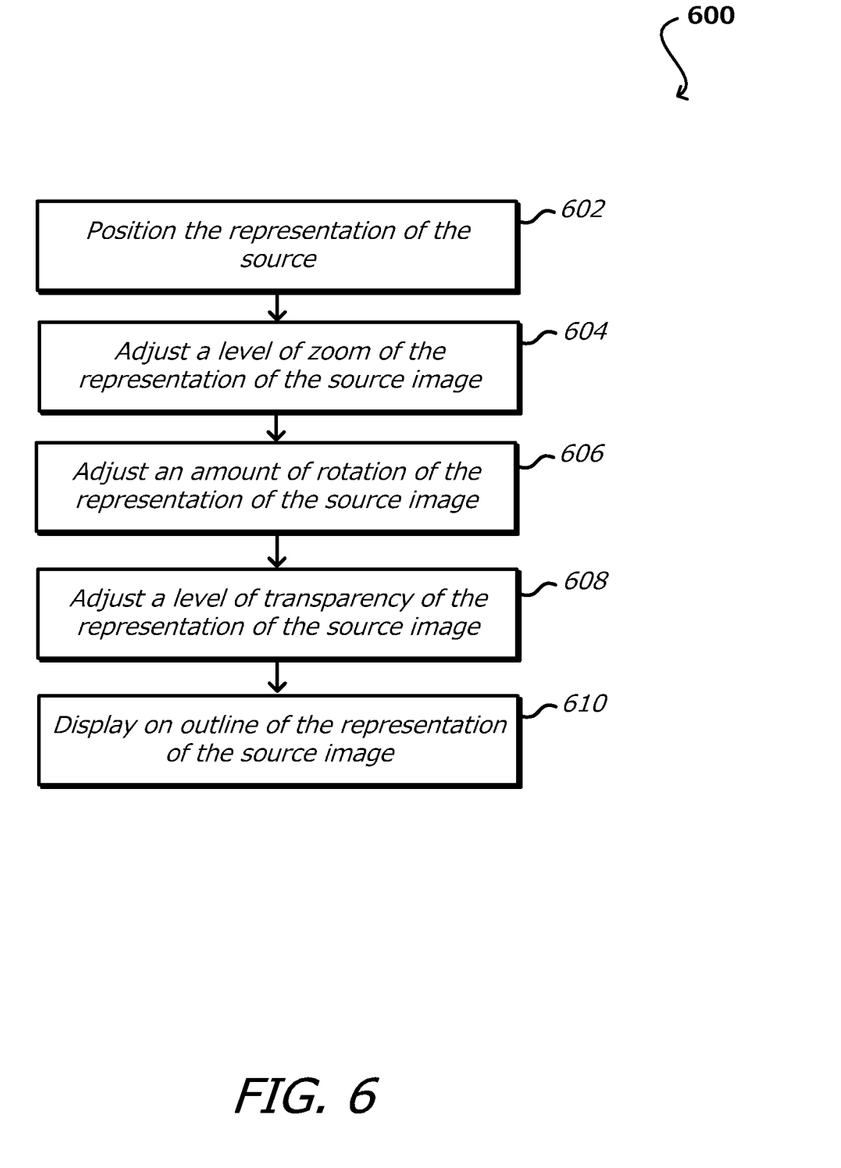
FIG. 6 illustrates an example process for managing an augmented reality view in accordance with an alternative embodiment.

FIG. 6 illustrates an example process 600 for overlaying the representation of the source image over the representation of the drawing surface in accordance with various embodiments. In this example, a user can position 602 the representation of the source image over the representation of the drawing surface. For example, the user can move the representation of the source image around the screen by tapping and dragging the representation of the scene to a desired position. In various embodiments, the user can adjust a position of the representation of the scene using one or more visual indicators. For example, in various embodiments, visual indicators can be provided to assist the user in positioning the representation of the source image where the user intends to sketch or otherwise create the scene on the representation of the drawing surface. The user can interact with the visual indicators such as by selecting or otherwise contacting the area of the display substantial orthogonal the visual indicator. For example, a user-selection of visual indicator can cause the representation of the source image to move left, right, up, and/or down on the display screen of the device.

As described, various embodiments can enable a user to obtain various alternate views for the representation of the scene, providing the user with these and other types of image modification abilities. The types of views available, number of views available, and other such modifications can depend at least in part upon an image processing enhancement or adjustment. For example, in addition to adjusting a position of the representation of the scene, the representation of the scene can include adjusting at least one display property of the representation of the source image to place the representation of the scene as the user wants the scene drawn on the drawing surface. Modifying the placement of the image on the canvas can include any one of adjusting 604 a level of zoom of the representation of the source image, adjusting 606 an amount of rotation of the representation of the source image, adjusting 608 a level of transparency of the representation of the source image, and displaying 610 an outline of the representation of the source image. In accordance with various embodiments, adjusting a zoom level can include zooming-in or zooming-out of the image displayed on the device. Adjusting a transparency can include, for example, adjusting how "see through" or transparent the representation of the source image is. A slider or other indicator can be provided to adjust the transparency level from completely transparent to no level of transparency. Displaying an outline view, for example, causes only an outline or the edges of the representation of the scene to be displayed. Various other image adjustments can be made as contemplated by one skilled in the art.

Figure 7:
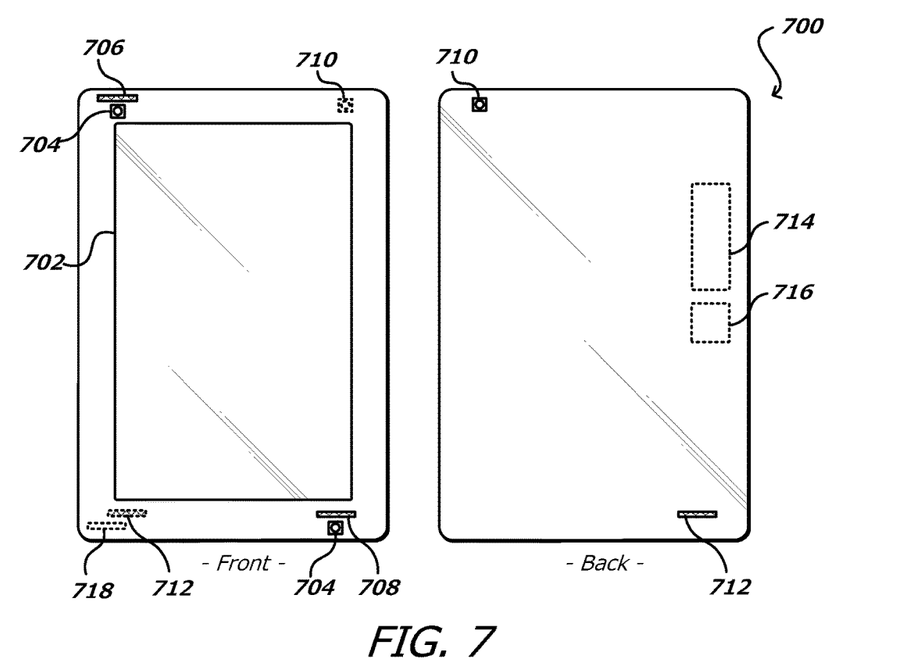
FIG. 7 illustrates front and back views of an example portable computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
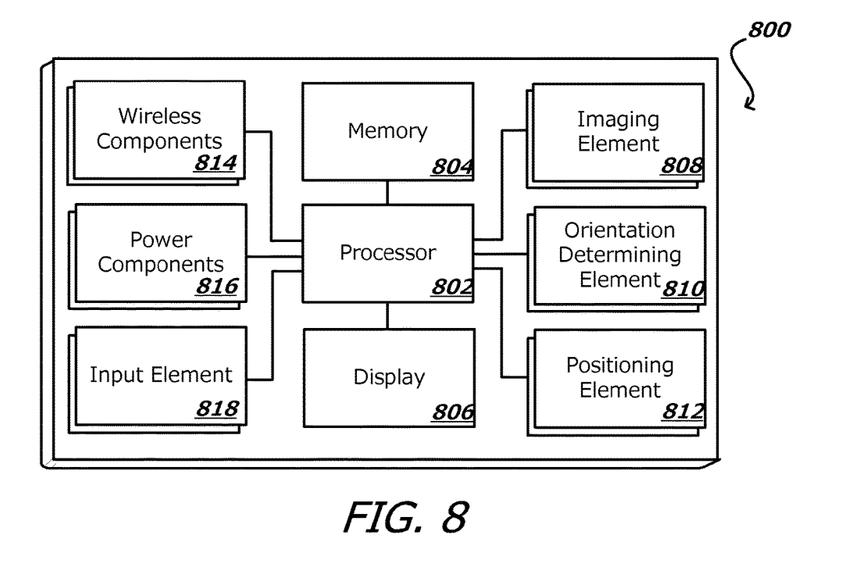
FIG. 8 illustrates an example set of basic components of a portable computing device, such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
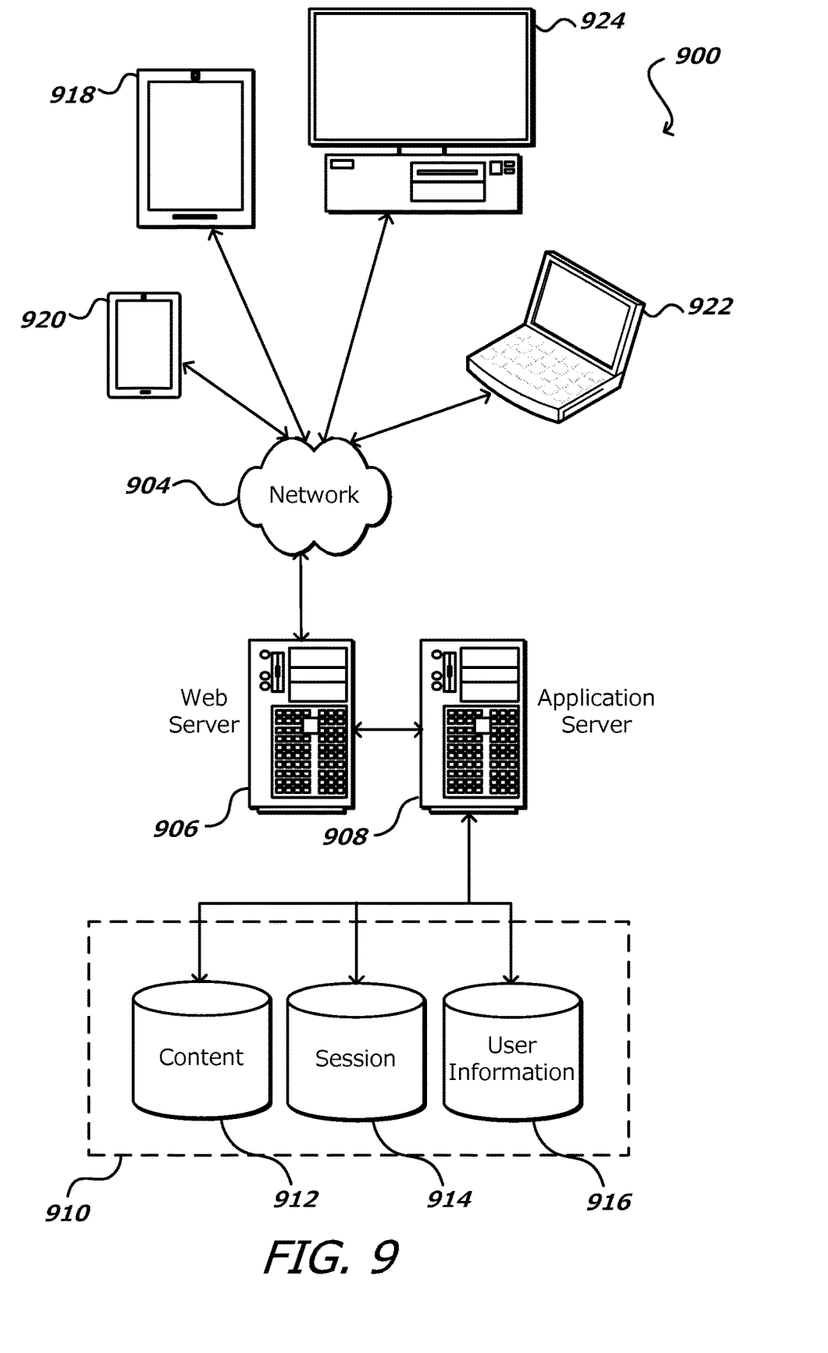
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   obtaining first image data using a camera of a computing device, the first image data including a representation of a point of interest;
   obtaining second image data of a live camera view that includes a representation of a physical surface;
   analyzing the second image data to determine a boundary that includes the representation of the physical surface;
   presenting a view of the point of interest overlaid on the representation of the physical surface and confined within the boundary;
   using an image processing algorithm to generate an outline of the point of interest;
   detecting, concurrently with obtaining the second image data, hand-written markings on the physical surface representing a drawing of the point of interest;
   generating a model representing a relationship between the physical surface and the second image data based at least in part on the hand-written markings, the model including a first rendering of the drawing from hand-written markings;
   detecting, concurrently with obtaining the second image data, additional hand-written markings;
   updating the model to generate an updated model that represents a second rendering of the drawing, the second rendering of the drawing corresponding to a current rendering of the drawing;
   comparing the updated model to the outline of the point of interest to determine an amount of unfinished drawing of the point of interest, the amount of unfinished drawing corresponding to a progress in creating the drawing of the point of interest; and
   generating a prompt to indicate the amount of unfinished drawing of the point of interest in drawing of the point of interest.

2. The computer implemented method of claim 1, wherein analyzing the second image data to determine the boundary further comprises:
   analyzing the second image data to detect boundary markings that include one of a registration mark, one or more corners of the representation of the physical surface, or one or more edges of the representation of the physical surface.

3. The computer implemented method of claim 1, further comprising:
   analyzing the second image data to detect one or more marks on the representation of the physical surface, wherein the one or more marks correspond to a mark made from at least a writing instrument, a drawing instrument, or a painting instrument, and wherein the point of interest includes one of a scene or an object.

4. The computer implemented method of claim 1, further comprising:
   locking a placement of the representation of the point of interest over the representation of the physical surface.

5. The computer implemented method of claim 1, further comprising:
   detecting movement of a computing device, the computing device including a display element configured to display the view of the representation of the point of interest overlaid over the representation of the physical surface; and
   tracking a location of the physical surface relative to the computing device,
   wherein a placement of the representation of a point of interest remains in substantially a same location on the representation of a physical surface during the movement of the computing device.

6. The computer implemented method of claim 1, further comprising:
  comparing the model to the representation of the point of interest; and
  generating at least one prompt, the at least one prompt including information indicating at least one or a progress in creating the point of interest, a number of errors in creating the point of interest, an indication of an error in creating the point of interest.

7. The computer implemented method of claim 1, further comprising:
  detecting a selection action being performed by a user with respect to at least one user-selectable element on a display element of a computing device, the at least one user-selectable element associated with one of a plurality of image editing algorithms;
  enabling one of the plurality of image editing algorithms based at least on the selection action being detected; and
  adjusting, based at least in part on the enabled one of the plurality of image editing algorithms, a current view of the display element.

8. The computer implemented method of claim 7, wherein the plurality of image editing algorithms are configured to perform at least one of adjusting a zoom level of the first image data, adjusting a rotation of the first image data, adjusting an opacity of the first image data, displaying on outline of the first image data, or adjusting a contrast of the first image data.

9. The computer implemented method of claim 1, wherein the first image data is acquired from one of a camera of a computing device, a data storage component of the computing device, derived from a three-dimensional model, or an application configured to operate on the computing device, and wherein the second image data includes a representation of a drawing surface acquired by a camera of a computing device.

10. The computer implemented method claim 5, wherein tracking the location of the physical surface includes:
  analyzing the first image data to identify a plurality of feature points representative of the point of interest; and
  tracking the physical surface with respect to the computing device using at least a random sample consensus (RANSAC) algorithm and based at least in part on a portion of the plurality of feature points.

11. The computer implemented method of claim 1, further comprising:
  invoking version control as additional hand-written markings are detected.

12. A non-transitory computer readable storage medium storing one or more sequences of instructions executable by one or more processors to perform a set of operations comprising:
  obtaining first image data using a camera of a computing device, the first image data including a representation of a point of interest;
  obtaining second image data of a live camera view that includes a representation of a physical surface;
  analyzing the second image data to determine a boundary that includes the representation of the physical surface;
  presenting a view of the point of interest overlaid on the representation of the physical surface and confined within the boundary;
  using an image processing algorithm to generate an outline of the point of interest;
  detecting, concurrently with obtaining the second image data, hand-written markings on the physical surface representing a drawing of the point of interest;
  generating a model representing a relationship between the physical surface and the second image data based at least in part on the hand-written markings, the model including a first rendering of the drawing from hand-written markings;
  detecting, concurrently with obtaining the second image data, additional hand-written markings;
  updating the model to generate an updated model that represents a second rendering of the drawing, the second rendering of the drawing corresponding to a current rendering of the drawing;
  comparing the updated model to the outline of the point of interest to determine an amount of unfinished drawing of the point of interest, the amount of unfinished drawing corresponding to a progress in creating the drawing of the point of interest; and
  generating a prompt to indicate the amount of unfinished drawing of the point of interest in drawing of the point of interest.

13. The non-transitory computer readable storage medium of claim 12, further comprising instructions executed by the one or more processors to perform the operations of:
  determining a boundary that corresponds to the representation of the physical surface; and
  analyzing the second image data to detect boundary markings that include one of a registration mark, one or more corners of the representation of the physical surface, or one or more edges of the representation of the physical surface.

14. The non-transitory computer readable storage medium of claim 13, wherein the boundary is detected based at least in part on using at least one of line detection algorithms, edge detection algorithms, feature detection algorithms, scale-invariant feature transform (SIFT) algorithms, speeded up robust features (SURF) algorithms, or corner detection algorithms.

15. The non-transitory computer readable storage medium of claim 12, further comprising instructions executed by the one or more processors to perform the operations of:
  detecting movement of a computing device, the computing device including a display element configured to display the view of the representation of the point of interest overlaid on the representation of the physical surface within a boundary that corresponds to the representation of the physical surface; and
  tracking a location of the physical surface relative to the computing device,
  wherein a placement of the representation of a point of interest remains in substantially a same location on the representation of a physical surface during the movement of the computing device.

16. A system, comprising:
at least one processor; and
memory including instructions that, when executed by the at least one processor, cause the system to:
  obtain first image data using a camera of a computing device, the first image data including a representation of a point of interest;
  obtain second image data of a live camera view that includes a representation of a physical surface;
  analyze the second image data to determine a boundary that includes the representation of the physical surface;

present a view of the point of interest overlaid on the representation of the physical surface and confined within the boundary;
use an image processing algorithm to generate an outline of the point of interest;
detect, concurrently with obtaining the second image data, hand-written markings on the physical surface representing a drawing of the point of interest;
generate a model representing a relationship between the physical surface and the second image data based at least in part on the hand-written markings, the model including a first rendering of the drawing from hand-written markings;
detect, concurrently with obtaining the second image data, additional hand-written markings;
update the model to generate an updated model that represents a second rendering of the drawing, the second rendering of the drawing corresponding to a current rendering of the drawing,
compare the updated model to the outline of the point of interest to determine an amount of unfinished drawing of the point of interest, the amount of unfinished drawing corresponding to a progress in creating the drawing of the point of interest; and
generate a prompt to indicate the amount of unfinished drawing of the point of interest in drawing of the point of interest.

* * * * *